Figure 1:
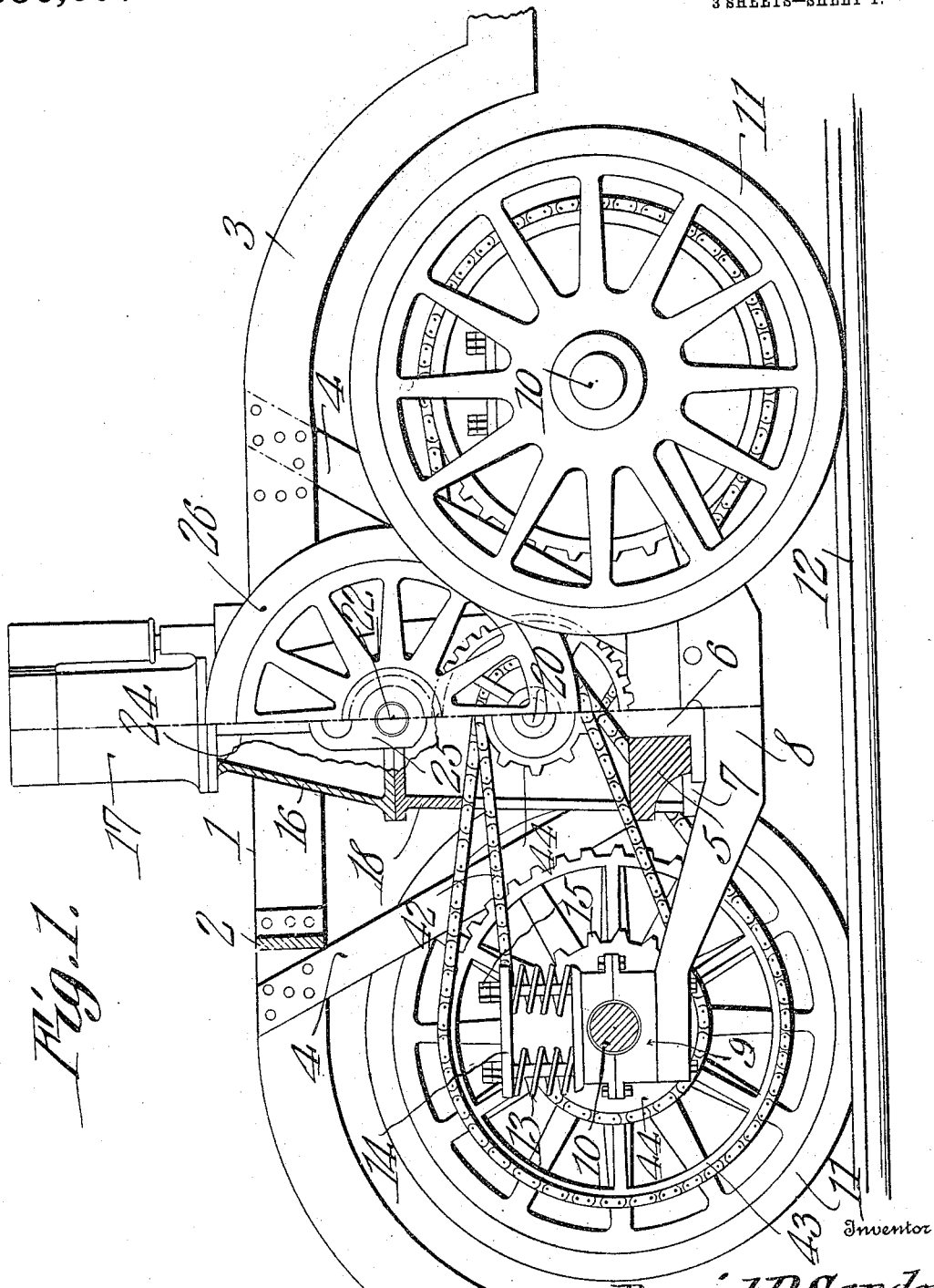

D. P. SANDERS.
POWER CAR TRUCK.
APPLICATION FILED NOV. 8, 1909.

950,057.

Patented Feb. 22, 1910.

3 SHEETS—SHEET 1.

Witnesses

Inventor
David P. Sanders
By C. A. Snow & Co.
Attorneys

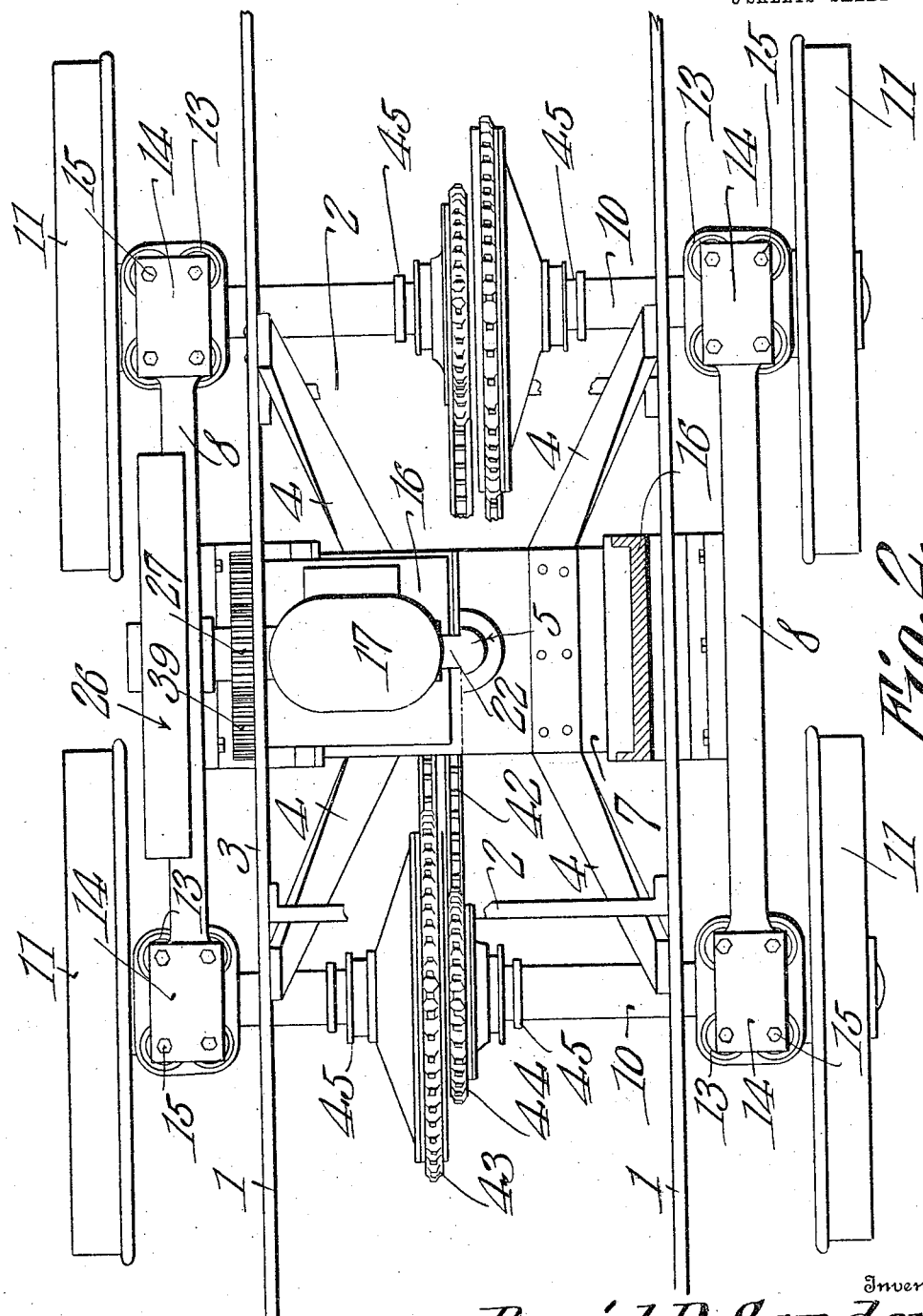

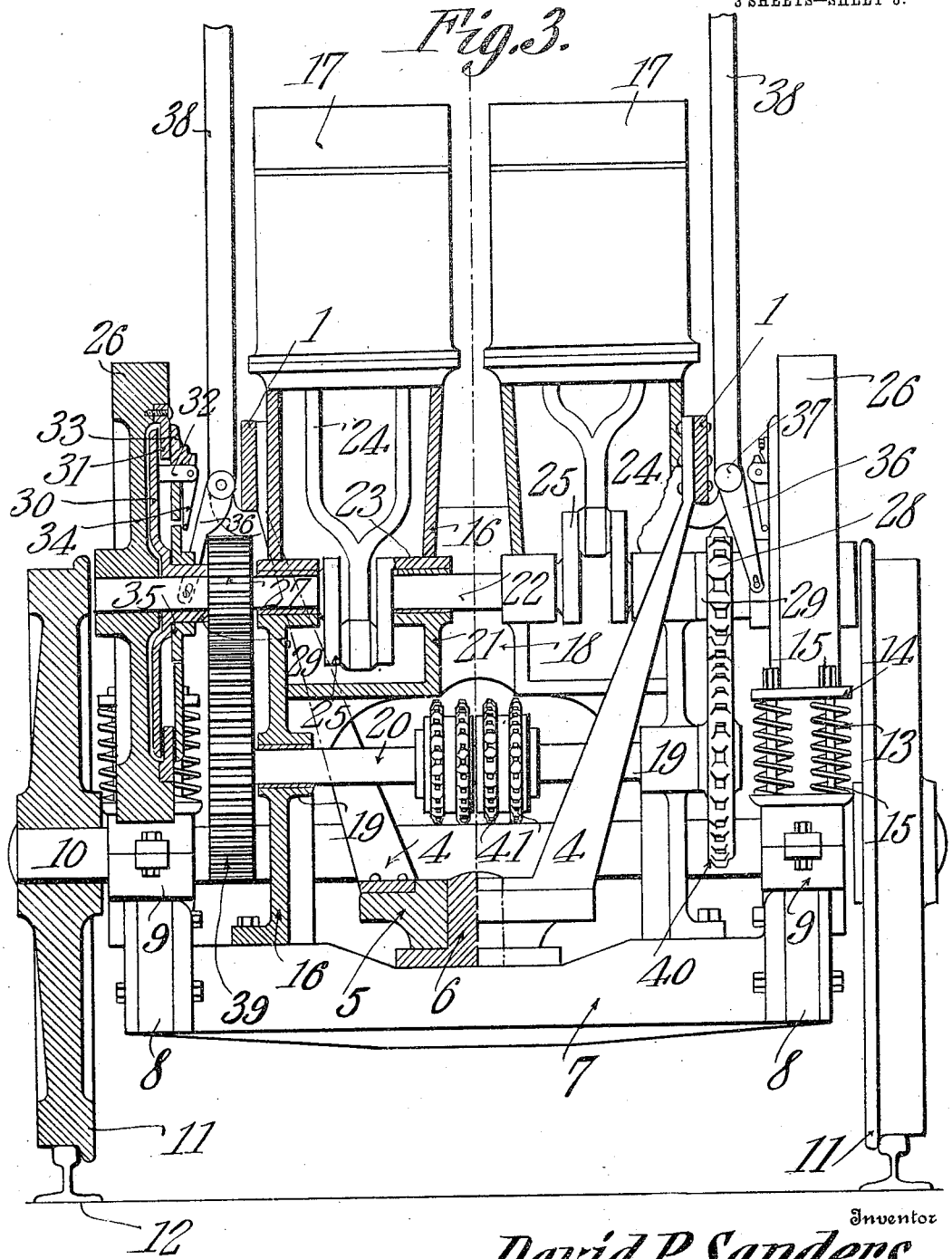

UNITED STATES PATENT OFFICE.

DAVID P. SANDERS, OF LANCASTER, PENNSYLVANIA.

POWER CAR-TRUCK.

950,057.  Specification of Letters Patent.  Patented Feb. 22, 1910.

Application filed November 8, 1909. Serial No. 526,843.

*To all whom it may concern:*

Be it known that I, DAVID P. SANDERS, a citizen of the United States, residing at Lancaster, in the county of Lancaster and State of Pennsylvania, have invented a new and useful Power Car-Truck, of which the following is a specification.

This invention relates to motor cars and the object of the invention is to provide a truck which will possess great strength and with which will be combined the frame of engines arranged to drive the car and gearing connecting the engines with the driving wheels.

Other secondary objects of the invention will hereinafter appear, and the invention consists in certain novel features which are illustrated in the accompanying drawings and will be hereinafter first fully described and then particularly pointed out in the appended claims.

In the drawings, Figure 1 is a view partly in side elevation and partly in vertical longitudinal section of a truck constructed in accordance with my invention. Fig. 2 is a plan view showing engines removed and parts in horizontal section, and Fig. 3 is a transverse sectional elevation of the truck and engines.

In carrying out my invention, I employ longitudinal sills or girders 1 which are secured to or built as a part of the car body and are connected by transverse braces or beams 2, the girders being provided near their ends with arched portions 3 to accommodate the driving gear. These sills or girders 2 carry the car body and it will be understood that a motor such as an internal combustion engine is provided on each car. Secured to the sills or girders 3 are the upper ends of braces 4 which converge downward from the sills and have their lower ends secured to the turn table or swivel 5 which is mounted upon the stud or king pin 6 provided at the center of the bolster 7 which is disposed transversely of the truck and has its ends secured to the truss bars 8 extending between and supporting the journal boxes 9 which carry the axles 10 upon which the driving wheels 11 are secured, the said wheels being adapted to run upon a track 12, as will be readily understood. It will be observed that the braces 4 are substantially U-shaped with spreading arms and that a pair of braces is provided at each side of the truck, the central portion or shoulder of the U being bolted to the turn table or swivel 5, as will be readily understood. The journal boxes 9 are adapted to move vertically relative to the truss bars 8 and are held normally against the truss bars by springs 13 arranged upon the upper sides of the journal boxes and bearing against plates 14 through which bolts 15 extend to the end of the truss bars in the usual manner, four of the springs being provided for each journal box in my invention in order to furnish a truck in which great strength will be present, while at the same time the car body will have sufficient vertical movement to assure the comfort of the passengers when running curves or passing over any small stones which may find a rest upon the track rails.

The engine frame 16 is bolted upon the upper side of the bolster 7 and rises therefrom between the sills of girders 1, a cylinder 17 being mounted on the upper end of the frame.

In the practical application of my invention four engines are mounted upon each truck and I have so illustrated the device in the drawings, but the engines are duplicates and the description of the frame of one engine will suffice for the description of both, the two frames being connected at the center by an arched back plate or web 18 preferably formed integral with the rear edges of the sides so as to increase the rigidity of the structure.

The engine frame is constructed in two members or sections, the lower member being bolted directly to the bolster and rising therefrom to a point near the sills or girders 1, and the upper member resting upon the lower member and being bolted thereto, while the arched web or back plate 18 extends between the upper ends of the lower members. About midway its height, the lower member is constructed to present a bearing 19 in which a counter shaft 20 is journaled while a reinforcing web or brace 21 is provided on the face of the back plate or web 18, the said web or brace 21 furnishing a compartment in which lubricant may be stored for application to the crank shaft 22 which is journaled in the upper edge of the lower member of the frame. The upper member of the frame is formed with a half sleeve 23 at its lower end which coacts with the upper end of the lower member to provide a bearing for the crank shaft, and the cylinder 17 rests directly upon the upper end of the said upper member of the frame. The engine cylinders are doubled and a forked piston rod 24 extends from each pair of engines and is connected with the crank 25 of the crank shaft so as to transmit motion thereto. A fly wheel 26 is mounted on each end of the driving crank shaft and these fly wheels are secured rigidly to the shaft and are adapted to be locked to a spur wheel 27 or a sprocket wheel 28 at the will of the motorman, whereby the motion of the driving shaft will be imparted to the said gearing and from the same transmitted to the driving wheels, as will presently more fully appear. The spur gear 27 and the sprocket wheel 28 are each mounted loosely upon the driving shaft, and each has its hub 29 extended outward and formed integral with a disk 30 forming one member of a friction clutch adapted to clamp a flange 21 carried by the fly wheel. A short standard or stem 32 projects from the inner face of the disk 30 and the inner member of the friction clutch, 33, is carried by the said stem or standard. A dog 34 is pivoted in the inner end of the stem or standard 32 and has its upper end bearing upon the plate 33, while its lower end depends to and rests against the side of a ring or collar 35 which is loosely mounted upon the hub of the spur or sprocket wheel and to the said ring or collar is pivoted the end of a link or crank arm 36 depending from a rock shaft 37 which is suitably mounted upon the engine frame, and an operating lever 38 rises from the said rock shaft so as to be within convenient reach of the motorman. By throwing the lever 38 outward the link or crank arm 36 will be caused to swing inward and thereby carry the ring or collar 35 against the lower end of the dog 34 and swing the same inward so that the members of the clutch will be forced tightly against the opposite sides of the flange 31 and the gear wheel consequently locked to the fly wheel so as to rotate with the same. The spur wheel 27 meshes directly with a larger gear wheel 39 on one end of the counter shaft 20, while the sprocket wheel 28 is connected by means of a suitable sprocket chain with a larger sprocket wheel 40 secured on the opposite end of the crank shaft. Either the spur gear 27 or the sprocket wheel 28 is to be locked to the fly wheel so as to rotate with the driving shaft accordingly as it is desired to propel the car forward or backward, and it will be seen at once that in this manner the direction of movement of the car will be readily controlled, inasmuch as the gear wheel 39 will move in the opposite direction to the spur gear 27, inasmuch as it meshes directly therewith, while the sprocket wheel 40 will rotate in the same direction as the sprocket wheel 28, as will be readily understood.

Upon the counter shaft, at the center of the same, I provide a plurality of sprocket wheels 41 and these sprocket wheels are connected by chains 42 with sprocket wheels 43 and 44 on the axles 10. It will be observed that two sprocket wheels are provided on each axle and this arrangement provides for different speeds of the car irrespective of the speed at which the engine may be driven. In order to provide for this variation in the speed of the truck, the sprocket wheels 43 and 44 are mounted loosely on the axles and are adapted to be coupled to the axle by slidable clutch members 45 mounted on the axle at the opposite sides of the sprocket wheels so that when either of said clutch members is moved into engagement with its respective sprocket wheel, the said sprocket wheel will be locked to the axle and the axle consequently rotated therewith. These clutches are manipulated through any convenient form of adjusting device and as the adjusting device forms no part of my present invention I have considered it unnecessary to illustrate the same. It will also be observed that, for the sake of clearness, I have omitted the sprocket wheels 43 and 44 and the sprocket chains 42 from Fig. 3 of the drawings.

From the foregoing description, taken in connection with the accompanying drawings, it is believed that the advantages of my improved truck will be readily appreciated. It will be observed that the engines are mounted directly on the truck and this arrangement not only economizes space, but will increase the traction powers of the truck by placing the weight of the engines and their frames directly upon the truck, and thereby holding the wheels steadily to the rails. The construction shown and described, furthermore, permits the use of large driving wheels and at the same time brings the engine into such a position that it will be supported by the driving wheels and will occupy but little space within the car so that the movements of the motorman will not be restricted. The truck is intended more particularly for use in connection with cars in which a separate compartment is provided for the operator, and the body of the car may be hung as low as with the cars now in common use. The construction employed by me moreover permits the transmission of the power by sprocket gearing so that great flexibility in the truck is attained and the jarring incident to travel over a rough road bed will not be apt to cause any breakage of the parts which would result in stopping the car. It will be furthermore observed that the construction is such that the lower end of the engine frame is below the axles so that the center of gravity is brought to a low level and consequently stability of the truck is assured.

Having thus described my invention, what I claim is:

1. In a truck for motor cars, the combination of sills or girders, braces secured to and converging downwardly from the said girders, a turn table secured to the lower ends of said braces, a bolster upon which the said turn table is swiveled, truss bars secured to the ends of the said bolster, and driving wheels carried by the outer ends of said truss bars.

2. The combination of a bolster, arched sills or girders, and converging braces secured to the said sills and having a swiveled connection with the bolster.

3. The combination of a bolster, an engine frame secured upon and rising from the bolster, truss bars secured to the bolster, axles mounted on the said truss bars, a counter shaft journaled in the engine frame, gearing between the said counter shaft and the axles, a driving shaft also mounted in the engine frame, and gearing between the driving shaft and the counter shaft, and means whereby the driving shaft will be rotated from the engine.

4. In a car truck, the combination of girders arranged to carry a car body, a bolster, supports for the girders having a swiveled connection with the bolster, carrying wheels supporting the bolster, and an engine frame secured upon and rising from the bolster.

5. In a truck for motor cars, the combination of a bolster, and an engine frame secured to and rising from the bolster and providing bearings for a counter shaft and a driving shaft.

6. In a truck for motor cars, the combination of a bolster, and an engine frame consisting of a lower member secured to the bolster and rising therefrom and provided with a bearing for a counter shaft and having its upper end formed into a half bearing for a driving shaft, and an upper member resting upon the lower member and having a half bearing in its lower end.

7. The combination with a bolster, of a frame member secured to and rising therefrom and consisting of side plates or standards and a back plate or web connecting the said standards, and upper members secured upon the upper ends of the said standards and web.

In testimony that I claim the foregoing as my own, I have hereto affixed my signature in the presence of two witnesses.

DAVID P. SANDERS.

Witnesses:
 CHAS. E. LONG,
 HARRY ALLEN WEBSTER.